R. B. ROBBINS.

Cultivators.

No. 5,676. Reissued Dec. 2, 1873.

Witnesses:

W. H. Du Hamel

Thomas Byrne

Inventor.

R. B. Robbins.

Per H. S. Abbot attorney.

AM. PHOTO-LITHOGRAPHIC CO. N.Y. (OSBORNE'S PROCESS.)

UNITED STATES PATENT OFFICE

RICHARD B. ROBBINS, OF ADRIAN, MICHIGAN.

IMPROVEMENT IN CULTIVATORS.

Specification forming part of Letters Patent No. 141,462, dated August 5, 1873; reissue No. 5,676, dated December 2, 1873; application filed October 13, 1873.

*To all whom it may concern:*

Be it known that I, RICHARD B. ROBBINS, of Adrian, in the county of Lenawee and State of Michigan, have invented certain new and useful Improvements in Cultivators; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention consists in certain improvements in sulky-cultivators, which are hereinafter particularly described.

Figure 1:
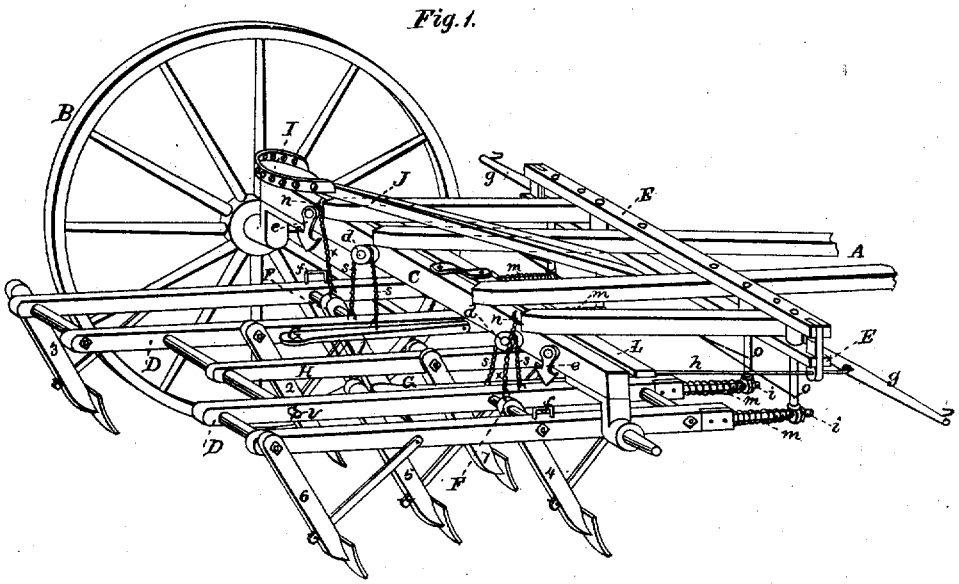
Figure 2:
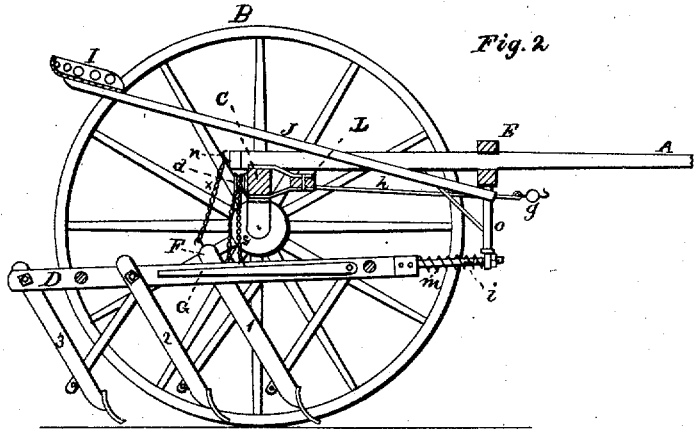
Figure 3:
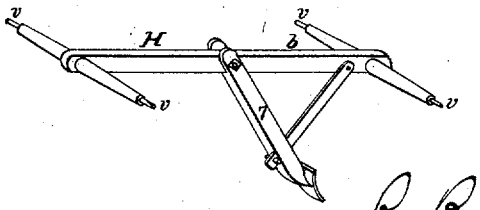

In the drawings, Figure 1 is a perspective view of my invention. Fig. 2 is a side view taken upon a line running longitudinally through the center. Fig. 3 is a sectional view, showing the cross-head H.

A in the drawings represents the neap, B the wheel, and C the axle, of a sulky-cultivator. D D represent swinging frames, to which the plows are attached, and which are, respectively, connected to pendent arms *o* from cross-bars E, as shown in the drawings. They are also attached to the axle by means of the chains *x*, hooks *n*, and standard F. The letter *m* represents coiled springs arranged upon the metallic shanks *i*, by which the rails of the swinging frames D D are united with the pendent arms of the cross-bar and the front ends of said rails proper. It will be observed that the metallic shanks of said rails are passed through eyes at the lower end of the pendent arms, and are secured by nuts, and that the springs *m* encircle said shanks. The object of the nuts is twofold: First, to fasten the machine together, and, second, to regulate the space between the swinging frames D D when used as a corn-cultivator.

The office of the foot-levers G, chains *s*, and pulley *d* is to raise the cultivator out of the ground; and my object in placing the foot-levers on the inside of the swinging frames D D is to enable the operator to raise the plows out of the ground with greater facility, less power, and more natural; and it also enables me to construct my cultivators with three plows on each side, as shown. The office of the springs *m* is to permit of a lateral or vibrating motion, and to aid in restoring the plows to a direct line of draft whenever they may have been forced therefrom. Thus, in cultivating corn or other small plants, when the operator finds that the plows are running too near the rows, he pushes them out with his feet, and holds them until the object is passed, when he takes his feet from the machine, and the springs at once force the plows back into position; or, in case he wishes to run the plows nearer the rows, he draws the cultivator in, keeps them in that position as long as desired, removes his feet, and they at once assume the position of direct line with the draft. The office of the chains *x* is to hold up the swinging frames D D, regulate the depth of the plows, and, by being placed in the center of each frame D D, as indicated, they form a pivot or point for the frames to play across. The office of the pendent anchor-shaped hooks *e* is to hold the plows out of the ground in going to and from the field, and, by means of the springs *m*, are automatic.

When the operator wishes to raise the plows out of the ground and fasten them, he presses down on the levers G with his feet, which will raise the frames D D until the staples *f* come in contact with the lower ends of said pendent hooks; continuing the pressure, the said frames are crowded sidewise and upward until the staples *f* reach the recesses in said pendent hooks, when the springs force them in said recesses, and hold them until released by the operator; and it makes no difference which side of the hook the staples *f* strike, the result is the same, and avoids the necessity of carrying the frames sidewise with the hands in order to hook them up.

In order to convert my machine into a walking-cultivator, I attach handles to the frames D D, in the usual manner, and use the pendent hooks above described. I also contemplate using larger blades or shovels on the inside rails, for hilling the corn when necessary. This, of course, will increase the lateral pressure of the frames D D, to overcome which I shall use heavy wire for my springs on the outside metallic shanks.

My description thus far refers to the machine when used in corn. To convert it into a field or full cultivator, I place the double cross-head H between the swinging frames D D, as indicated by the dotted lines of Fig. 1 of the drawings, and attach it to said frames D D by means of eyebolts *v* passing through openings in the inner rails of said frames, and when in position it is secured by pins.

My object in constructing the double cross-head as indicated is to allow space enough between the center rail *b* and swinging frames D D for the foot-levers G to pass up and down in.

The office of the springs *m* in a field-cultivator is to permit of a vibratory motion of the cultivator, rendering it less liable to breakage, and at the same time securing a flexible cultivator.

I represents the seat, and J the seat-bars. L represents the draw-bar, and *h* the rods to which the whiffletrees *g* are attached. Figures 1, 2, 3, 4, 5, 6, and 7 represent standards, to which the blades or shovels are fastened. My plows are constructed in the shovel form, and attached to the standards in the ordinary manner.

Having thus fully described my invention, what I claim as new, and desire to secure by Letters Patent, is—

1. The springs *m m m m*, in combination with the swinging frames D D and pendent arms *o*, for the use and purposes described.

2. The double cross-head H, in combination with the inner rails of the swinging frames D D, for the uses and purposes described.

3. The anchor-shaped pendent hooks *e*, in combination with the staples *f*, when used in a lateral-moving cultivator, substantially as described.

4. The metallic shanks *i* of the drag-bars, passing through the eyes of the pendent arms *o*, in combination with adjusting-nuts and spiral springs, substantially as described.

In testimony that I claim the foregoing I have hereunto set my hand this 10th day of October, 1873.

RICHARD B. ROBBINS.

Witnesses:

HENRY W. ROSS,

WM. S. GREENLY.